United States Patent Office 3,382,629
Patented May 14, 1968

3,382,629
DAMPED TUBULAR ANTENNA MAST
Wolf-Dieter Reutlinger, Darmstadt, Germany, assignor to Dr. Reutlinger & Sohne, Darmstadt, Germany, a firm of Germany
Filed Feb. 1, 1966, Ser. No. 524,040
Claims priority, application Germany, Feb. 3, 1965, R 39,805
7 Claims. (Cl. 52—173)

ABSTRACT OF THE DISCLOSURE

The invention relates to the combination of a tubular mast, such as for transmitter antennas, which is subject to becoming vibratory in a wind, and a pendulum in the mast and suspended from a portion of the mast, and dampening means for the pendulum for producing a reactive effect to oppose vibration of the mast.

---

This invention relates to a tubular mast for wireless telegraphy transmitting stations and similar uses of tall masts. Such tubular masts are used in recent times in increasing number. They are marked by cheapness of production, ease of assembly and most of all, that antennas mounted on the mast are accessible in winter, as opposed to those on lattice or girder masts.

In order to steady these masts against lateral forces, such as wind pressure, guying is usually provided. It has been found that in spite of such guying, masts of this sort often are excited by the wind to inadmissibly severe mechanical oscillations or vibration.

The oscillation could very easily become so severe that, for example, damages to the leads to the antennas occurred, and that the variously provided elevator cabins in the tubular masts for the personnel became jammed and unusable. Moreover under circumstances, especially in the case of long durations of wind impact, the induced oscillation could considerably endanger the strength of the mast.

The cause of this oscillation stems from the fact that at the tubular mast, owing to the passing by wind, vortices or eddy currents in the leeward zone behind the mast shed off in regular intervals. The frequency of these eddy currents is determined primarily by the wind velocity and the mast diameter. When this frequency of eddy current shedding approaches the natural frequency of the mast a very pronounced oscillation of the mast is set up due to resonant action.

Surrounding the mast with coils to suppress or alter eddies or vortices, in hope that a periodic excitation might be inhibited, has been investigated. These studies showed, disregarding the cost of the added coils, a considerable increased stressing of the mast both due to the weight of the coils and the inherent increasing of wind pressure. The finding makes this expedient highly questionable. Then too, the addition of the coil does not really solve the problem because in spite of the coil being present the eddy currents still occur.

In the case of a very slender bridge pillar or tower subject to windage vibration it has been proposed to fill the tower with sand. The result of this was that, first, only owing to the mass of the sand the natural frequency of the tower was lowered markedly. In the meantime the loose sand worked away owing to its granular form as a dampening agent. Such a measure is not suited for use in wireless antenna masts.

The invention enables a simple and effective suppression of the oscillations. As a brief description, in the interior of the mast there is mounted and connected with mast wall, one or more adjustably damped oscillatory systems, combining mass and restoring force. The greatest movements by the oscillation of the interior system run substantially in a plane perpendicular to the axis of the mast. The oscillation frequency and damping of the interior system are so related in tuning with the mast which may oscillate that they act counter to the alternating forces exciting the mast. By the mast and interior systems oscillating in counter phase, the vibratory forces are balanced out. The mass of the interior system is preferably $\frac{1}{20}$ to $\frac{1}{40}$ that of the oscillatory mass of the mast. The interior oscillatory system is effectively mounted in the higher portion of the mast where there is maximum oscillation of the mast. It is essential that the suspension of the interior oscillatory system be so that restorative forces can act the same in all directions, so that it may oscillate with no directional biasing. This is necessary since it must work irrespective of wind directions.

A simple pendulum hanging vertically in the mast is a suitable form of oscillatory body. It may be mounted by a gimbal or still more simply by a round elastic piece of wire so that it exhibits equal restorative forces from all directions when it is swung out.

Just as the mounting of the pendulum should have no directional bias, this also is required for the damping. The pendulum body should be symmetrical with respect to the planes of its movements so as not to impart biasing of the direction of damping, whether the bob is solid or made up of component parts. The bob dips into a vessel of oil. For the pendulum to be effective and for avoidance of resonant frequency, regulation of the damping is essential. This can be especially advantageously realized by heating the oil in the vessel with an electric heater. The viscosity of the damping oil varies with the temperature and consequently does the degree of damping. It is therefore possible because of this to alter the damping from a position outside the mast, for example from the transmitter station house, and to adjust it to the correct amount. Usually a better way is to provide the oil vessel with a thermostat responsive to the temperature of the oil to control it so that the temperature, viscosity and degree of damping are regulated independently of the outside or ambient temperature.

The degree of damping necessary for the desired action is ascertained by a special test and need be checked only at extended time intervals.

Another way, and by which the damping can be made variable, is to use a mixture of oil and finely powdered iron as the damping fluid and to provide a variable electromagnetic field within the damping vessel by means of an adjustable electromagnet. Through the action of such a field on the iron dispersion the viscosity of the damping fluid can be altered.

The appropriate tuning of the oscillatory system as well as the adjustment of the degree of damping can easily be effected by test. To this end, the mast is made to oscillate at different frequencies by means of a mechanical oscillator, for example, by means of rotating unbalanced weights, and by measuring the displacement at different positions, the location of the antinode is determined. Here or nearby the antinode, the interior oscillating system is attached, and it is so adjusted with respect to the natural frequency and amount of damping that the various oscillations of the mast are held to a minimum which is no longer a source of annoyance.

Summary of the invention

In the tubular mast, preferably near the top, an oscillatory member such as a pendulum is suspended from a mount on the mast to oscillate freely in all directions and essentially in a plane perpendicular to the axis of the mast. A dampening means, free from directional bias, also mounted on the mast, such as a vessel of viscous fluid in which the pendulum swings, coacts, and sets up counter forces when the frequency of the member is properly timed with respect to the natural frequency of the mast. The viscosity of the fluid may be varied in order for this condition to obtain.

Figure 1:
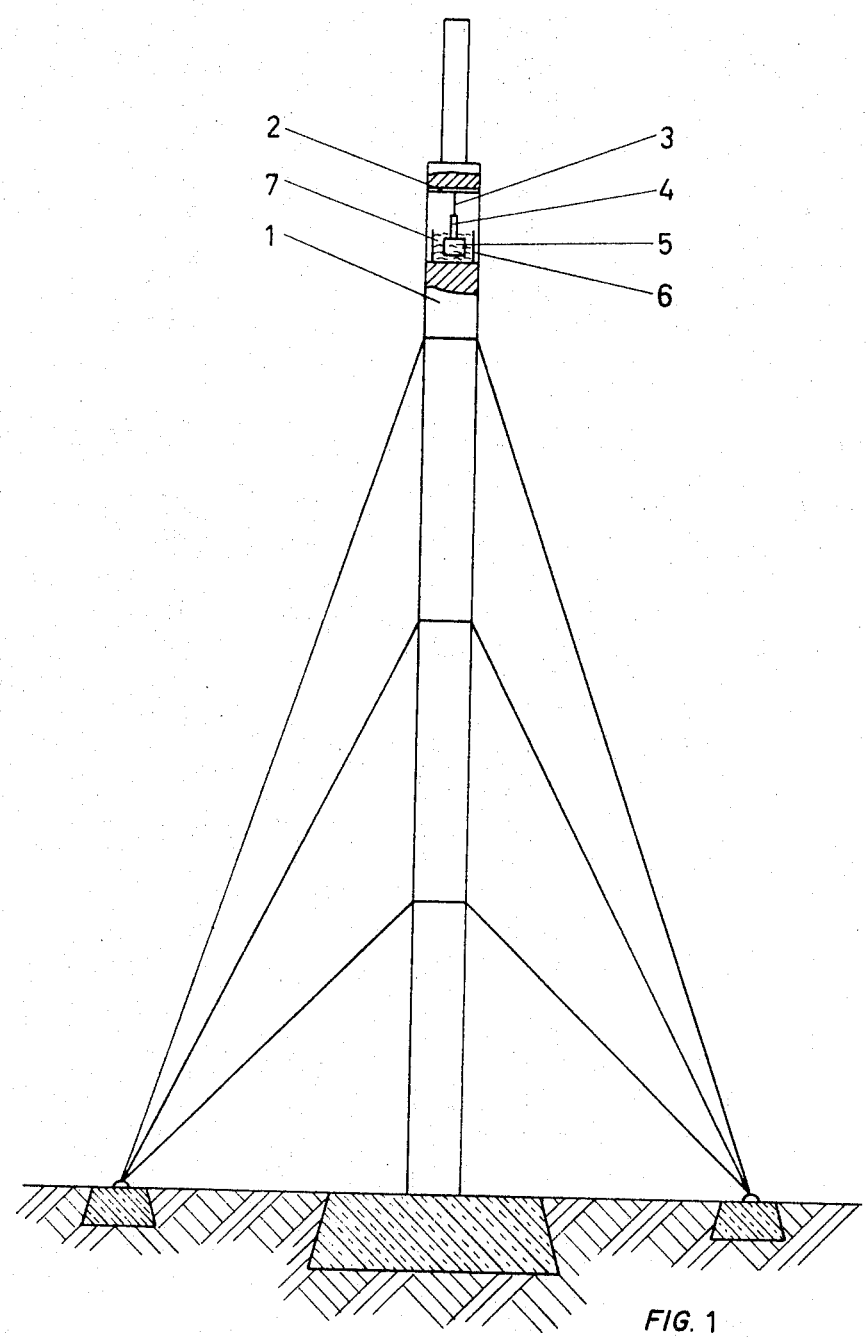
FIG. 1 shows the mast with the invention in elementary form.

As shown in FIG. 1 the mast 1 is provided with an inset carrier 2. From the carrier hangs, by a short piece of steel wire or rod 3, a pendulum having a shank 4 and massive bob 5, the latter being preferably of cylindrical shape. The bob extends downwardly into a vessel 6 that is filled with oil or other suitable damping material. It is not necessary that the pendulum hang in the center of the mast, but the action remains the same when it is disposed to the side. This side mounting may be desirable for enabling an elevator to be provided in the mast.

Figure 2:
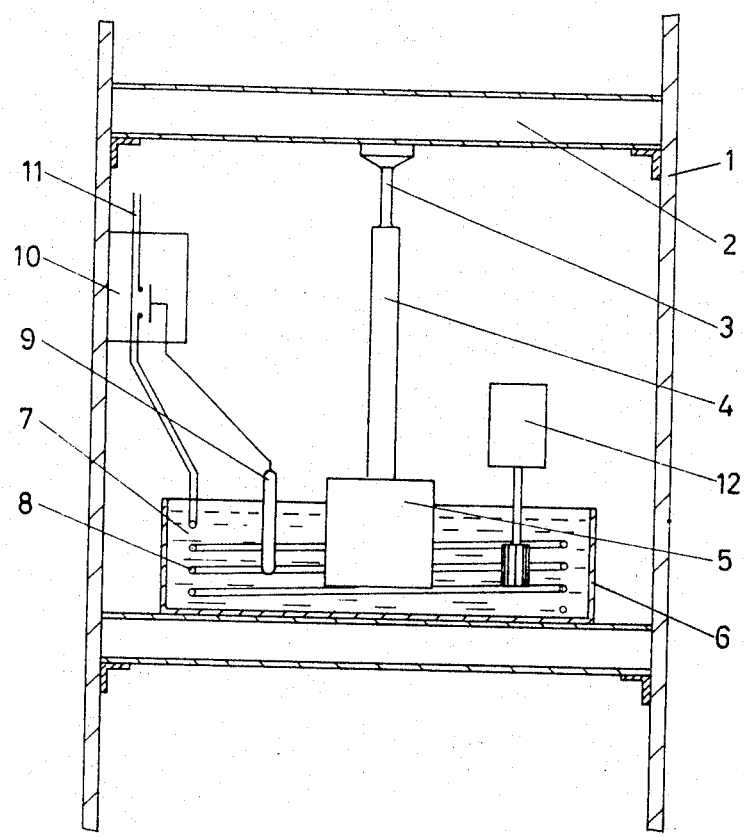
FIG. 2 shows details of the invention.

In FIG. 2 the above mentioned elements are shown in detail. The oil in the vessel is heated with an electrically heated helical element 8 or the vessel can be constructed as is an electrically heated pressure cooker with the heating body at the bottom.

A thermostat 9, can be, for example, an expansion thermometer that actuates a switch 10 in its case so that the heating or part of the heating is cut off when the set temperature is exceeded, and cut in when temperature is below that value. The two main leads for the heater are shown at 11. For equalizing temperature variations in the contained oil, a mild stirrer 12 may be provided to cause a continuous circulation of the damping oil, but this should not be so violent as to interfere substantially with normal damping of the pendulum.

According to the degree of constancy the damping is to be held to, other types of thermostats may be provided such as those operating by resistance thermometers or thermocouples, and the operation of the switch 10, if they are used, can be through interposed electric switching instruments and amplifiers. This depends on the precision desired.

More than one pendulum may be necessary and this must be determined for each individual situation according to in what manner the mast oscillates, which can be easily determined by the mounting of several oscillation meters longitudinal of the mast.

The invention claimed is:

1. In combination with a tubular mast for sending station antennas, a mounting member fixed to the mast and therein, oscillatory means mounted on the mounting member for oscillation in any direction transverse to the mast, and traveling substantially in a plane to which the axis of the mast is perpendicular, and adjustable damping means for producing a damping effect on the oscillatory means to oppose vibratory motion of the mast.

2. In a combination as claimed in claim 1, said damping mean being a vessel fixed within and to the mast and containing oil in which the oscillatory means travels, and regulatable heating element for the oil.

3. In a combination as claimed in claim 2 and a thermostat for regulating the heating element to hold the temperature of the oil to a predetermined temperature.

4. A combination as claimed in claim 1, said damping means being a vessel fixed to the mast and containing a mixture of oil and powdered iron in which the oscillatory means moves, and means for applying an electromagnetic field to the mixture to alter the viscosity of the mixture.

5. A combination as claimed in claim 2, said oscillatory means being a pendulum suspended from the mounting member and having the bob thereof in oil.

6. In a combination as claimed in claim 5, the mass of the mast being from 20 to 40 times as great as that of the pendulum.

7. A combination as claimed in claim 1, the natural period of the oscillatory means when the mast is stationary, the natural period of vibration of the mast and the amount of adjustable damping of the oscillatory means being so related that as the mast tends to vibrate at natural frequency a counter force between the mast and the oscillatory means develops to reduce vibration of the mast.

References Cited

UNITED STATES PATENTS

| | | | |
|---|---|---|---|
| 2,667,237 | 1/1954 | Rabinow | 188—101 X |
| 3,174,589 | 3/1965 | Chen | 188—1 X |
| 3,310,138 | 3/1967 | Reed | 188—1 X |

HENRY C. SUTHERLAND, *Primary Examiner.*